United States Patent [19]

Elrod et al.

[11] 4,181,617

[45] Jan. 1, 1980

[54] AQUEOUS DRILLING FLUID AND LUBRICANT COMPOSITION

[75] Inventors: Stephen H. Elrod; Weldon B. Nance, both of Houston, Tex.

[73] Assignee: Milchem Incorporated, Houston, Tex.

[21] Appl. No.: 877,484

[22] Filed: Feb. 13, 1978

[51] Int. Cl.² .......................... C09K 7/02; C10M 3/32
[52] U.S. Cl. ................................ 252/8.5 C; 252/48.6; 252/49.3; 260/399
[58] Field of Search .............. 252/8.5 A, 8.5 C, 8.5 P, 252/48.6, 48.2, 49.3; 260/399

[56] References Cited

U.S. PATENT DOCUMENTS

| 3,027,324 | 3/1962 | Rosenberg | 252/8.5 |
|---|---|---|---|
| 3,047,493 | 7/1962 | Rosenberg | 252/8.5 |
| 3,761,410 | 9/1973 | Mondshine et al. | 252/8.5 |

OTHER PUBLICATIONS

Rosenberg et al., Article in Journal of Petroleum Technology, vol. 11, Aug., 1959, pp. 195–202.

*Primary Examiner*—Herbert B. Guynn
*Attorney, Agent, or Firm*—William C. Norvell, Jr.

[57] ABSTRACT

An aqueous drilling fluid is provided having a lubricant therein consisting essentially of the reaction product of a fatty vegetable oil with 4,4'-thiodiphenol.

10 Claims, No Drawings

AQUEOUS DRILLING FLUID AND LUBRICANT COMPOSITION

BACKGROUND OF THE INVENTION

1. Field of the Invention

The present invention relates to a drilling fluid lubricant comprising the reaction product of a fatty vegetable oil with 4,4'-thiodiphenol and the method of use thereof in the drilling of subterranean oil and gas wells.

2. Description of the Prior Art

When drilling oil and gas wells into the earth, and in particular when utilizing a rotary drilling method comprising a bit and a bit stem, it has long been the practice to circulate past the drilling apparatus a drilling fluid to cool the drill bit, lift cuttings out of the hole, and counterbalance the subterranean formation pressure encountered. One of the more important functions of the drilling fluid is to reduce the considerable torque on the rotating drill pipe caused by friction between the outside of the drill pipe and the wall of the well. When adverse drilling conditions, such as drilling through offsets, highly deviated holes, and dog legs result in increased frictional forces, the lubricating properties of aqueous drilling fluids are generally insufficient to prevent the drill pipe from tolerating excessive torque, thus leading to costly delays and interruptions in the drilling process. Thus, there is needed an additive for aqueous drilling fluids which will impart enhanced lubricating properties to the fluid.

The present invention provides an additive for aqueous drilling fluids which will minimize the adverse frictional forces between the drill pipe and the wall of the well, thereby diminishing the torque experienced by the drill pipe during rotation.

SUMMARY OF THE INVENTION

The present invention provides a lubricant for use in aqueous drilling fluids, said lubricant being the reaction product of a fatty vegetable oil with 4,4'-thiodiphenol. The composition is added to aqueous drilling fluids and circulated down the bore hole of a well being drilled, for the reduction of torque and drag experienced by the drill pipe.

DESCRIPTION OF THE PREFERRED EMBODIMENTS

Because the lubricant of the present invention is difficult to classify with respect to reaction phenomenon, it is referred to simply as a reaction product. The lubricant is prepared by reacting together from about ½% to about 2% by weight of 4,4'-thiodiphenol with from about 99.5% to about 98% by weight of a fatty vegetable oil. Preferably, the fatty vegetable oil will be a member selected from the class consisting of castor oil, coconut oil, corn oil, palm oil and cottonseed oil. Even more preferably, the fatty vegetable oil will be cottonseed oil, inasmuch as it is readily apparent, is comparatively inexpensive, and is easily reactable with 4,4'-thiodiphenol. The selected amount of fatty vegetable oil utilized in reaction with the 4,4'-thiodiphenol will vary from about 99.5% to about 98% by weight, and will depend upon the particular selected fatty vegetable oil.

In reacting the selected fatty vegetable oil with 4,4'-thiodiphenol, it has been found that an amount of from about ½% to about 2% by weight will provide a satisfactory drilling fluid lubricant having enhanced properties. It has also been found that amounts in excess of about 2% by weight of 4,4'-thiodiphenol may be incorporated into the lubricant and subsequently into the aqueous drilling fluid. However, these additional amounts have not been found to enhance the lubricity of the additive of the present invention.

When reacting 4,4'-thiodiphenol with a fatty vegetable oil to produce the lubricant of the present invention, it has been found preferable to carry out the reaction in the presence of heat from about 110° F. to about 180° F. Even more preferably, the reaction is conducted by application of heat and low shear to the reactants. However, it is not absolutely necessary that heat be applied to the reactants, since the reaction proceeds slowly when the reactants are sheared at normal room temperature.

It has been found that the reaction of the fatty vegetable oil and the 4,4'-thiodiphenol will require only about 45 minutes when making small laboratory batches of about 1 quart. In scale up, or large batches of quantities in excess of 1,000 gallons, a reaction time of at least about 2 hours is required to produce a satisfactory lubricant.

The lubricant and drilling fluid of the present invention are further disclosed in the following examples:

EXAMPLE I

A lubricant composition was prepared in the laboratory by reacting approximately 98.75 parts by weight of cottonseed oil with 1.25 parts by weight, 4,4'-thiodiphenol. The reaction was carried out by application of heat to about 120° F. on a hot plate equipped with a magnetic stirrer. The reaction required approximately 45 minutes for completion. The resulting reaction product was visually observed to be an opaque, yellow liquid, and was utilized in the evaluation examples set forth below.

EXAMPLE II

The lubricant reaction product prepared as in Example I was evaluated in lubrication tests utilizing a laboratory formulated drilling fluid prepared in which 42 gallons of water was utilized as a base to which was added 20 pounds of Wyoming bentonite clay and 2 pounds of chrome lignosulfonate. This base drilling fluid was weighted to 12 pounds per gallon with barite. The base drilling fluid was treated with 0.8% by weight of the lubricant as prepared in Example I. The base and base-treated samples were tested for lubricity characteristics by utilizing the Falex Lubricant Tester, manufactured by the Faville-LeVally Corporation of Bellwood, Illinois. This testing apparatus provides for the measurement of torque at increasing loads which are applied to a journal-V block assembly during prescribed time intervals. The test sample is placed into an auxiliary reservoir and pumped through the test cup and back into the reservoir. Circulation through the test cup is maintained at a constant rate. A load of 100 pounds is applied to the journal-V block assembly by means of a ratchet wheel loader. A constant loading rate is provided by the eccentric loading arm at the top of the machine. A constant load of 100 pounds is maintained for a 2 minute and 45 second time interval, and immediately thereafter a torque reading is recorded. Subsequent loads from 100 pounds to 800 pounds are applied in 100 pound increments and held for 2 minutes and 45 seconds. Lubrication properties are evaluated by comparing torque measurements at the loading increments among a series of test samples of the lubricant. A reduction in torque is an indication of increased lubrication effectiveness. The torque reading is read in "inch-pounds", that is, the force of friction in pounds per square inch of surface area. The durability of the lubrication properties is evaluated by comparing the loads at which seizure of the metal surfaces of the journal and V blocks occurs. The results of this test indicated that the lubricant of the present invention was effective in drastically reducing friction. These results were further compared to tests in which the base was treated with 0.8% by weight cottonseed oil alone, and 0.8% aqueous 4,4'-thiodiphenol alone, thus clearly indicating that a synergistic reaction product is obtained when these materials are reacted together to provide a synergistic lubrication composition.

The complete results of this test are set forth below in Table II.

TABLE II

| Sample | Load Level | | | | | | | |
|---|---|---|---|---|---|---|---|---|
| | 100 | 200 | 300 | 400 | 500 | 600 | 700 | 800 |
| Base Fluid | 10 | 24 | 42 | Seizure | | | | |
| Base Fluid plus 0.8% Cottonseed Oil | 10 | 15 | 16 | 17 | 22 | 28 | Seizure | |
| Base Fluid plus 0.8% of a 3% aqueous solution of 4.4'-thiodiphenol | 10 | 21 | 30 | 56 | Seizure | | | |
| Base Fluid plus 0.8% Lubricant | 4 | 8 | 10 | 13 | 15 | 15 | 18 | 21 |
| Base Fluid plus 0.8% Lubricant, after hot-rolling at 250° F. for 20 hours | 5 | 6 | 8 | 9 | 10 | 12 | 15 | 17 |

EXAMPLE III

A further test was conducted in accordance with the procedure set forth above to determine the effectiveness of the lubricant of the present invention, as prepared in Example I, and evaluated in a simulated salt water-based drilling fluid. For this test, a base drilling fluid was prepared in which 42 gallons of saturated sodium chloride solution was utilized as the base to which was added 25 pounds of Martin Number 5 Ball Clay, together with 175 g. of calcium chloride. The pH of this drilling fluid was adjusted to 11.0 with incremental additions of calcium hydroxide. The base fluid was treated with 4 pounds per barrel of the lubricant composition prepared as in Example I. The base and base-treated samples were tested as described in Example II. The results of this test indicated that the lubricant of the present invention drastically reduced friction in a salt water mud. The results are further described in the table set forth below:

TABLE III

| Sample | Load Level | | | | | | | |
|---|---|---|---|---|---|---|---|---|
| | 100 | 200 | 300 | 400 | 500 | 600 | 700 | 800 |
| Base Fluid | 12 | 20 | 32 | 42 | 53 | Seizure | | |
| Base Fluid plus 1 lb/bbl Lubricant | 9 | 12 | 13 | 14 | 16 | 17 | 19 | 20 |

EXAMPLE IV

The testing procedure utilized in the previous examples was again utilized to determine the effectiveness of the lubricant of the present invention in a field mud from a drilling location experiencing high torque difficulties. The base drilling fluid was treated with 3 pounds per barrel of the lubricant as prepared in Example I. The base and base-treated samples were tested as in the previous Examples, and the results of this test indicated that the lubricant of the present invention was quite satisfactory in enhancing the lubrication characteristics of this field mud. The results of this test are further described in the following table:

TABLE IV

| Sample | Load Level | | | | | | | |
|---|---|---|---|---|---|---|---|---|
| | 100 | 200 | 300 | 400 | 500 | 600 | 700 | 800 |
| Base Fluid | 16 | 23 | Seizure | | | | | |
| Base Fluid plus 3 lb/bbl Lubricant | 11 | 15 | 15 | 16 | 16 | 16 | 16 | 16 |

EXAMPLE V

A further test of the lubricant composition of the present invention was conducted wherein the base fluid was a laboratory mud of unusually high solids content. A sample mud was prepared which contained 20 pounds per barrel of Wyoming bentonite clay, 10 pounds per barrel of calcium montmorillonite, 10 pounds per barrel of illite, 6 pounds per barrel of chrome lignosulfonate, 1 pound per barrel of sodium chloride, and 271 pounds per barrel of barite, as a weighting agent. One sample of the base mud was treated with 4 pounds per barrel of cottonseed oil and a second sample was treated with 4 pounds per barrel of the lubricant, as prepared in Example I. The base and base-treated samples were tested as described in the previous examples. The results clearly indicated that the lubricant of the present invention substantially reduced friction, and thereby torque, even at extreme loads. However, the sample treated only with cottonseed oil failed to match the lubricity characteristics of the lubricant of the present invention, as indicated in the following table:

TABLE V

| Sample | Load Level | | | | | | | |
|---|---|---|---|---|---|---|---|---|
| | 100 | 200 | 300 | 400 | 500 | 600 | 700 | 800 |
| Base Fluid | 8 | 17 | 24 | 35 | Seizure | | | |
| Base Fluid plus 4 lb/bbl Cotton- | | | | | | | | |

TABLE V-continued

| Sample | Load Level | | | | | | | |
|---|---|---|---|---|---|---|---|---|
| | 100 | 200 | 300 | 400 | 500 | 600 | 700 | 800 |
| seed Oil | 7 | 13 | 15 | 15 | 15 | 33 | Seizure | |
| Base Fluid plus 4 lb/bbl Lubricant | 5 | 8 | 9 | 11 | 13 | 15 | 17 | 18 |

EXAMPLE VI

A further test of the lubricant composition of the present invention was conducted as in Example II. Four test samples were prepared utilizing an aqueous base fluid including 4 pounds per barrel corn oil, 4 pounds per barrel corn oil reacted with 0.8% by weight 4,4'-thiodiphenol, 4 pounds per barrel castor oil, and 4 pounds per barrel castor oil reacted with 0.8% by weight 4,4'-thiodiphenol, respectively. Again, an effective lubricant composition was provided when each of the corn oil and castor oil additives was reacted with 4,4'-thiodiphenol. The results of this test are set forth in the table below:

TABLE VI

| Sample | Load Level | | | | | | | |
|---|---|---|---|---|---|---|---|---|
| | 100 | 200 | 300 | 400 | 500 | 600 | 700 | 800 |
| Base Fluid plus 4 lb/bbl corn oil | 6 | 7 | 12 | 14 | 17 | Seizure | | |
| Base Fluid plus 4 lb/bbl corn oil reacted with 0.8% TDP | 3 | 8 | 10 | 12 | 14 | 16 | 18 | Seizure |
| Base Fluid plus 4 lb/bbl castor oil | 5 | 12 | 16 | 19 | 26 | 34 | Seizure | |
| Base Fluid plus 4 lb/bbl castor oil reacted with 0.8% TDP | 4 | 9 | 11 | 15 | 16 | 19 | 23 | Seizure |

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed as desired to be secured by Letters Patent is:

1. A lubricant additive for aqeuous drilling fluids consisting essentially of the reaction product of from between about 99.5 percent by weight and about 98 percent by weight of a fatty vegetable oil and from between about ½ percent by weight and about 2 percent by weight of 4, 4'-thiodiphenol, the reaction occurring in the presence of heat from between about 110° F. and about 180° F. or upon the application of shear at normal room temperature.

2. The lubricant additive of claim 1 wherein the fatty vegetable oil is a member selected from the class consisting of cottonseed oil, corn oil, palm oil and castor oil.

3. The lubricant additive of claim 1 wherein the fatty vegetable oil consists essentially of cottonseed oil.

4. An aqueous drilling fluid comprising water, a clayey base and a lubricant consisting essentially of the reaction product of from between about 99.5 percent by weight and about 98 percent by weight of a fatty vegetable oil and from between about ½ percent by weight and about 2 percent by weight of 4, 4'-thiodiphenol, the reaction occurring in the presence of heat from between about 110° F. and about 180° F. or upon the application of shear at normal room temperature.

5. The aqueous drilling fluid of claim 4 wherein the fatty vegetable oil is a member selected from the class consisting of cottonseed oil, corn oil, palm oil and castor oil.

6. The aqueous drilling fluid of claim 4 wherein the fatty vegetable oil is cottonseed oil.

7. The aqueous drilling fluid of claim 4 wherein said additive is provided in said aqueous drilling fluid in an amount of at least about 0.8% by weight.

8. In the process of drilling a subterranean well wherein there is circulated in the bore hole of said well an aqueous drilling fluid, the steps of providing lubrication of the surfaces of metallic drilling tools by such drilling fluid compising admixing with said drilling fluid a lubricant additive consisting essentially of the reaction product of from between about 99.5 percent by weight and about 98 percent by weight of a fatty vegetable oil and from between about ½ percent by weight and about 2 percent by weight of 4, 4'-thiodiphenol, the reaction occurring in the presence of heat from between about 110° F. and about 180° F. or upon the application of shear at normal room temperature, and circulating the drilling fluid throughout said well bore.

9. The method of claim 8 wherein said fatty vegetable oil is selected from the class consisting of cottonseed oil, corn oil, palm oil and castor oil.

10. The method of claim 8 wherein said fatty vegetable oil is cottonseed oil.

* * * * *